(12) United States Patent
Hennes

(10) Patent No.: US 8,641,396 B2
(45) Date of Patent: Feb. 4, 2014

(54) SPIRAL DISTRIBUTOR, DIE HEAD, BLOWN FILM LINE, AND METHOD FOR MANUFACTURING A BLOWN FILM

(75) Inventor: Jochen Hennes, Eschborn (DE)

(73) Assignee: Reifenhaeuser GmbH & Co. KG Maschinenfabrik, Troisdorf (DE)

( * ) Notice: Subject to any disclaimer, the term of this patent is extended or adjusted under 35 U.S.C. 154(b) by 167 days.

(21) Appl. No.: 13/068,899

(22) Filed: May 23, 2011

(65) Prior Publication Data
US 2011/0304071 A1 Dec. 15, 2011

(30) Foreign Application Priority Data

Jun. 10, 2010 (DE) .......................... 10 2010 023 302

(51) Int. Cl.
*B29C 47/20* (2006.01)
*B29C 47/90* (2006.01)

(52) U.S. Cl.
USPC ....... 425/72.1; 264/209.5; 425/380; 425/461; 425/467

(58) Field of Classification Search
USPC ............... 425/66, 72.1, 133.1, 380, 461, 467; 264/264, 209.5
See application file for complete search history.

(56) References Cited

U.S. PATENT DOCUMENTS

| | | | |
|---|---|---|---|
| 4,115,047 A * | 9/1978 | Stelmack | 425/72.1 |
| 4,185,954 A * | 1/1980 | Murakami et al. | 425/462 |
| 6,565,347 B1 | 5/2003 | Linkies et al. | |
| 6,866,498 B2 | 3/2005 | Sagar et al. | |
| 2005/0140046 A1 | 6/2005 | Hessenbruch | |
| 2005/0214400 A1 | 9/2005 | Hessenbruch | |

FOREIGN PATENT DOCUMENTS

| | | | |
|---|---|---|---|
| CA | 2500862 A1 * | 9/2005 | |
| DE | 199 24 540 | 11/2000 | |
| DE | 103 60 360 | 7/2005 | |
| DE | 10 2004 014 096 | 10/2005 | |

(Continued)

OTHER PUBLICATIONS

"Extrusionswerkzeuge für Kunststoffe und Kautschuk: Bauarten, Gestaltung und Berechnungsmöglichkeiten"; "Extrusion tools for plastic materials and rubber: configurations, design and calculation possibilities" by Walter Michaeli, with the cooperation of Ulrich Dombrowski . . . , second completely revised and extended edition; Munich, Vienna; HanserVerlag 1991, ISBN 3-446-15637-2 more specifically shows different spiral mandrel distribution tools starting at p. 159. on p. 160 line 4f, pp. 158-161.

(Continued)

*Primary Examiner* — Yogendra Gupta
*Assistant Examiner* — Joseph Leyson
(74) *Attorney, Agent, or Firm* — Collard & Roe, P.C.

(57) ABSTRACT

Foil extrusion lines use spiral distributors for producing a melt which is as homogeneous as possible during operation. The spiral distributors are mostly available as cylindrical or conical axial spiral distributors or as radial spiral distributors. The spiral distributors have spiral channels that run in a multiple spiral arrangement so that rather flat horizontal edges are formed precisely in initial sections and vertical edges are formed between the beginning of spiral channels and transition sections of adjacent spiral channels. The melt can easily adhere there. To accelerate the melt in critical areas, the course or the cross-section of the channels or the surface are modified.

15 Claims, 2 Drawing Sheets

(56) References Cited

FOREIGN PATENT DOCUMENTS

| EP | 0 655 312 | 5/1995 |
| EP | 1 579 976 | 9/2005 |
| JP | 57-189820 | 11/1982 |
| SU | 1682197 | 10/1991 |
| WO | WO 88/01226 | 2/1988 |

OTHER PUBLICATIONS

"Extrusionswerkzeuge für die Schlauchextrusion" by Dipl.-Ing. Georg Burmann, ETA Kunststofftechnologie GmbH, dated Feb. 3, 2006.
Search Report of DE 10 2010 023 302.01 dated Jul. 5, 2011 with English translation of relevant portions.

* cited by examiner

SPIRAL DISTRIBUTOR, DIE HEAD, BLOWN FILM LINE, AND METHOD FOR MANUFACTURING A BLOWN FILM

CROSS REFERENCE TO RELATED APPLICATIONS

Applicant claims priority under 35 U.S.C. §119 of German Application No. 10 2010 023 302.1 filed on Jun. 10, 2010, the disclosure of which is incorporated by reference.

BACKGROUND OF THE INVENTION

1. Field of the Invention

The invention relates to a spiral distributor for a die head of a blown film extrusion line, a die head for such a blown film line, a blown film line, a method for manufacturing a blown film as well as a blown film manufactured by means of this method. 2. The Prior Art The die head is the extrusion tool and thus the technological core of a blown film extrusion line. Regardless of its concrete configuration, the object of the die head is to mold the melt. The melt reaches the die head from one or several melt threads at the inflow of the tool and is to leave the die head with a uniform, thermally and mechanically homogeneous melt distribution via the outflow cross-section, which is shaped as an annular gap, downstream at the outflow of the tool.

The configurations of die heads customarily used today can be divided roughly into two groups: on the one hand, the group including spiral distributors with a cylindrical or conical shape, on the other hand, the group including radial spiral distributors, which are also called coil distributors.

The document DE 103 60 360 A1 shows a die head for a nine-layered film.

The book "Extrusionswerkzeuge für Kunststoffe und Kautschuk: Bauarten, Gestaltung und Berechnungsmöglichkeiten"; "Extrusion tools for plastic materials and rubber: configurations, design and calculation possibilities" by Walter Michaeli, with the cooperation of Ulrich Dombrowski . . . , second completely revised and extended edition; Munich, Vienna; Hanser-Verlag 1991, ISBN 3-446-15637-2" more specifically shows different spiral mandrel distribution tools starting at p. 159. On page 160 line 4f, the book describes how completely avoiding weld lines and flow marks is one of the main advantages of a melt distribution system.

The document DE 199 24 540 C1 discloses a cylindrical spiral distributor with a surrounding rotating mandrel.

Another cylindrical spiral distributor can be gathered from the document WO 88/01226 A1.

U.S. Pat. No. 6,866,498 B2 also shows a cylindrical spiral distributor in which outlets initially lead from a pre-distributor to deviating supply grooves. The supply grooves have ending areas. The spiral channels start at the end of the ending areas of the supply grooves.

It is common to all die heads, that the melt stream delivered by the extruder is initially divided into several individual flows. Star or ring-shaped distributor systems are predominantly used to this end. These so-called pre-distributors lead into the spiral-shaped channels, which are worked either into a mandrel (in the case of an axial, cylindrical or conical spiral distributor) or into a plate (in the case of a radial spiral distributor). The spiral channels run around the mandrel in the form of a multiple thread or are disposed in the form of a multiple spiral on the plate.

The depth of a channel usually decreases to zero in the direction of extrusion. The gap between the mandrel, respectively the plate, and an opposite side correspondingly increases. The gap between the mandrel, respectively the plate, and the opposite side thus becomes bigger. This causes a melt stream flowing in a spiral to be continuously divided into two parts: on the one hand a part which flows over the overflow bars which are located between two spirals; on the other hand a part which follows the course of the spiral channels.

Due to the overlaps of the channel flows, so-called "weld lines" are avoided and in addition to the desired mechanical homogeneity, a high thermal homogeneity of the melt is also achieved.

SUMMARY OF THE INVENTION

The object underlying the invention is to provide an improved spiral distributor.

The invention is solved by a spiral distributor for a die head of a foil extrusion line with a central axis which runs in the blowing direction and with a distributor flow direction which runs parallel to the central axis in the case of an axial spiral distributor, radially in the case of a plate spiral distributor and in the case of a conical axial distributor so that it can be projected onto the axis, a gusset area having beginnings of spiral channels around pre-distributor apertures and the spiral channels running at an angle relative to the distributor flow direction, a first spiral channel starting at a beginning, passing a second directly adjacent spiral channel downstream from its beginning after an initial section and running on downstream of its initial section and of its further section in its further section as a continuous spiral channel, so that during operation of the die head melt issuing from the second spiral channel overflows an overflow bar in the distributor flow direction toward the first spiral channel lying downstream, the spiral distributor having a overflow facilitator for the melt at the beginning, in the initial section and/or in the transition section of a spiral channel.

The invention is based first of all on the following observation:

A known problem of existing die heads designed with axial spiral distributors is that the mandrel is fitted as a seal in a cylindrical bore of the mostly plain outer tool part beyond the beginning of the spiral-shaped channel. A channel shaped as an annular gap for the melt is thus formed by means of this counterpart.

The area, in which the channels of the pre-distributor flow into the spirals of the distributor, is mostly called a "gusset area". The gusset area is geometrically formed by two edges:

First, there is a predominantly horizontally running edge between the spiral channel and the mostly plain outer tool part which extends with the spiral channel from its beginning to the beginning of the overlap with the adjacent spiral channel in the direction of rotation of the spiral channel. In the preceding text, this edge thus extends over the "initial section" of the spiral channel.

In a cross section, the horizontally running edge forms a corner with the mostly plain outer tool part. There are distinctly lesser wall shear stresses in this corner than in the round areas of the spiral channel. As a consequence a comparatively long sojourn time of the melt occurs in this area.

On the other hand, there is a predominantly horizontally running edge which runs in an axial direction in the area of the beginning of the overlap between the first and the second spiral channel which lies directly adjacently before it. In the preceding text, the beginning of the overlap is the "transition section" of the first spiral channel, that is, that area in which the initial section of the first spiral channel passes into the further section of the first spiral channel.

The vertically running edge forms the limit of the flow channel at the beginning of the overflow bar between the two aforementioned spirals. The volume flow which flows off over this bar between the two spirals in the area of the vertical edge is low and is additionally slowed by the vertical edge itself In other words—as with the horizontal edge—there are distinctly less wall shear stresses in the area of the vertical edge than in the remaining areas of the overflow bar between the spirals. As a consequence, comparatively long sojourn times of the melt also occur in this area.

The problem described above is aggravated in that, during warming of the extrusion tool, due to its greater diameter, the mantle expands more than the central mandrel, so that an increasingly big gap forms between them, in which the plastic melt can flow, in an area which should at least in a cold state have a seal. As a consequence of the long sojourn time of the melt in this area, it can thermally degrade there. Particles which have settled are then carried away from time to time by the flowing melt and lead to flaws in the melt. Disadvantageously, color changes can also become noticeable for similar reasons in the form of stripes in the foil.

In radial spiral distributors, both afore-mentioned edges can also be found radially or in the direction of the circumference of the distributor plate.

In a nutshell, as a consequence of the wall adhesion of the melt, the geometrical design of the gusset area according to the prior art, more specifically the geometry of both edges, leads to respectively distinctly longer sojourn times and as a consequence to a non-homogeneous foil structure. The corresponding flaws are often referred to as "spiral strips".

The long sojourn times furthermore imply a comparatively long rinsing time with changes in the composition, more specifically color changes.

The present invention solves the problem by proposing means to increase the flow speed of the melt in the critical areas.

The design of the spiral distributor has been changed in the result. More specifically, the design of the beginning of the initial section of the spiral channels has been changed. This results in a more homogeneous foil structure.

The following terms of the present invention must be explained:

The "blowing direction" should be that direction in which a line using the spiral distributor would blow out the foil in a hose shape. In a normal case, this would be perpendicular to the plane of the annular gap. It will usually be a vertical direction, in modern lines a vertical direction running upward, because blowing out is now carried out against the gravity.

In an axial spiral distributor, more specifically in the form of a cylindrical spiral distributor or in the form of a conical spiral distributor, the central axis, which runs in the blowing direction, even gives its name to the spiral distributor.

In a radial spiral distributor however, the plate will be horizontal. The melt stream either gets in from the outside or gets out from the inside, but is in any case diverted for blowing out. The blowing direction is thus also vertical there, that is perpendicular to the plate of the radial spiral distributor.

The "distributor flow direction" is a notional direction. Whether each individual particle in the flowing melt will indeed flow exactly in the distributor flow direction is certainly more than doubtful. The distributor flow direction should thus be understood as a purely geometrical, theoretical direction.

In the case of a cylindrical spiral distributor, the distributor flow direction should be understood as being parallel to the blowing direction, since the melt stream can theoretically flow in the blowing direction along straight lines on the lateral surface of the cylinder. In the case of a conical spiral distributor, the distributor flow direction in principle also runs parallel to the blow direction. The straight lines on the lateral surface through which the melt can theoretically flow indeed lie at an angle to the central axis. The distributor flow direction must however be understood as an overall resulting, virtual flow direction. On the one hand, it is only defined here in order to be able to describe the angle deviation of the melt channels, namely for both axial and radial spiral distributors. On the other hand, the inclinations of the individual theoretical melt flows along the circumference of a conical spiral distributor add up in such a manner that they result in a straight line which is coaxial with the central axis.

In theory, the host of straight lines running respectively obliquely relative to the vertical direction along the lateral surface of the cylinder stump must thus be respectively understood as a local distributor flow direction. Since however each spiral channel, which runs at an angle relative to such a host of oblique channels, also runs at an angle relative to the central axis, the central axis can be used as a measure for the angular position to simplify matters.

In a radial spiral distributor, the host of radially running straight lines is the "distributor flow direction".

The gusset area is that area in which outlets for the melt streams are disposed on the spiral distributor, so that the melt is divided into many small streams by the outlets of the pre-distributor, namely by the pre-distributor apertures and reaches the actual spiral area in this manner.

The "beginning" of the spiral channels is that point in which the spiral channel runs at least substantially in its course direction in the further section and/or in the beginning section. In the prior art, both last-mentioned directions are the same. In an embodiment of the present invention a difference between these two directions can be observed.

The repeatedly described "angle" is an angle of 020 to 90°; that is an acute angle. In other words, this means that in an axial spiral distributor, a projection of the spiral onto a vertical surface, which is perpendicular to the projection direction in the central axis, would show the spiral at such an angle relative to the central axis. In a radial spiral distributor, the angle is respectively measured locally relative to a radial beam.

"Downstream" designates a point which lies further in the direction of the blowing direction than an upstream point.

An "overflow facilitator" must be understood as any means running rather locally, that is not uniformly along the entire length of the spiral channel, which leads to the flow speed of the melt in the critical areas being increased, thus more specifically the overflow being increased. More specifically, measures which reduce the flow resistance for the overflow path, or which increase the flow resistance for the channel flow, are conceivable.

It must be explicitly understood, that if a spiral as known in the prior art has a continuous flattening along the entire length of the spiral, it does not fall under this term. Although a lesser channel depth in the transition area as compared to the initial section is also available in such a spiral, given the length of the spiral channel and, in contrast to it, the rather small length of the initial section, with a uniform flattening, one cannot however speak of an "acceleration measure in or at" the initial section.

In an advantageous embodiment of the invention, a spiral channel has, with regard to its course, a bend, a curve or a deviation in its transition section which can lead, with an adequate design to an improved flushing of an otherwise badly flushed edge. Through an adequate design it can be achieved that a greater proportion of melt can leave the spiral channel and flow downstream over the overflow bar.

Bends, curves and deviations through which for instance the further section of the spiral channel is only slightly deviated relative to the initial section are more specifically conceivable. According to initial considerations, angles below 45°, particularly below 30° relative to the distributor flow direction can appear here.

It is proposed that the further section of the spiral channel is disposed in such a manner that its extension beyond the differently running initial section would end at the beginning of the spiral channel. In such a design, only the initial section is deviated relative to the otherwise known orientation of spiral channels. The initial section of the spiral channel can more specifically run at a greater angle relative to the distributor flow direction and the spiral channel can then be led back in the transition section to the usually known course direction through a deviation or a double deviation.

If, with regard to its course, a spiral channel has another rise height in its initial section than in its further section, it is more specifically proposed that it has a lesser rise height in the initial section. This leads to the transition section running along relatively closely to the beginning of the initial section of the second directly adjacent spiral channel, more specifically closer than would be the case with a straight running course directly in the now available course direction of the further section of the spiral channel.

In other words the rise of the spiral channel in the initial section is smaller in a die head with such a distributor than in the following further section located downstream in the direction of extrusion.

The low rise of the spiral channel leads to the vertical edge (in the case of an axial spiral distributor) or the radial edge (in the case of a radial spiral distributor) being at first very short in the area of the overlap with the preceding adjacent spiral in the direction of rotation. This already improves the problem of the spiral strips. This results furthermore in a small bar width of the overflow bar between these two spirals, so that a great volume flow of melt flows off during operation.

After the vertical or radial edge at the beginning of the adjacent second spiral in the direction of rotation, the rise of the spiral channel is then preferably changed in such a manner that a greater bar width becomes available at the following overlap with the following third spiral in the direction of rotation. This facilitates a good distribution of the melt.

Accordingly, it is also proposed for instance that the overflow bar has a widening along the initial section of the second spiral channel, so that during operation the bar width over which the melt is to flow in the distributor flow direction is small at the beginning of the initial section of the second spiral channel, from the initial section of the second spiral channel to the further section of the first spiral channel, and more specifically has a minimum downstream of its beginning. It has already been explained that a small bar width over which the melt must flow supports a great volume flow.

It can be readily provided that, with regard to their course, the spiral channels have different beginnings at the pre-distributor apertures of the gusset area but subsequently run congruently in their initial and further sections. It is conceivable for instance that a pre-distributor respectively leads to the middle between two spiral beginnings and the melt is led on during operation to the beginnings of the spiral channels via a feed channel or two separated feed channels. In such a design, it can make sense that different local geometries occur at the beginning of the initial sections of the spiral channels, more specifically that the beginnings of respectively two adjacent spiral channels are briefly led together, wherein this can continue respectively in pairs around the entire spiral distributor.

It is proposed that the spiral channels have respectively a straight course in their initial and further sections. Such courses have proved efficient. Also, the flow conditions in courses designed in this way are already relatively well known.

Since acceleration means in the form of interventions in the geometry of the spiral course have already been presented above, it is possible according to a second aspect of the invention to conduct a local change in the section of the spiral channel in addition to the modification of the course.

It is thus proposed that a spiral channel cross-section in the course of the spiral channel has an extension and a reduction, more specifically with regard to a spiral channel width, a widening and a tapering and/or with regard to a spiral channel depth a deepening and a flattening.

It must be explained here that the term "spiral channel width" should be determined as the widest open measurement of the spiral channel which is perpendicular relative to the course of the spiral channel. This will usually be at the surface of the spiral channel. If the spiral channel distributor is formed cylindrically or conically, the spiral channel width is an axis across the opening of the spiral channel. If the spiral distributor is a plate, the spiral channel width is a segment in the plane of the surface of the plate.

The "spiral channel depth" is the deepest measurement as measured perpendicularly relative to the spiral channel course and perpendicularly to the spiral channel width.

Spiral distributors are customarily configured in such a manner that the depth of the spiral channels uniformly and monotonously decreases in the direction of the flow. The depth of the overflow gap thereby often increases. In contrast, the channel geometry can be narrowed in a design proposed here, in order to increase the flow speed in the critical area. After running through the critical area, meaning the further section of a spiral channel and after the transition section, the channel is first extended as opposed to the prior art and according to the aspect of the invention proposed here and only subsequently preferably continuously tapered as known in the prior art.

Such a spiral distributor can be manufactured inexpensively.

Depending on the design, the sojourn time of the melt at the predominantly horizontally running edge during operation of the die head can be reduced. Such a geometry modification, namely also introducing spiral channels in the opposite side, can more specifically be implemented in a significantly less expensive manner than in the variant known from the prior art.

It is thus advantageous if the spiral channel cross section has a lesser channel width and/or depth in the transition section than in the further course in the further section of the spiral channel, preferably a lesser channel width and/or depth than on both sides of the transition section. If the width and depth of the channel are precisely smaller at the transition section than on both sides of the transition section a local minimum of width and/or depth is provided at the transition section.

With the help of the previously described exemplary embodiment it has become clear that a preferred implementation is designed in such a manner that along its further course after the transition section, the spiral channel cross section has first a widening and/or deepening and subsequently a tapering and/or flattening.

According to a third proposition for an overflow facilitator it is advantageous if the spiral distributor has a local surface difference for an easier overflow.

It must be explained that the term "local surface difference" refers to a locally defined area of the surface which has a different surface design as compared to the remaining surface, which is predominant preferably in terms of size.

It shall be understood that several local surface differences can be provided. Each spiral cannel can more specifically have such a surface difference or a host of surface differences.

It is readily conceivable that a flow path side of the surface of the critical vertical or radial edge is equipped with an adapted anti adhesive coating, so that an adherence of the plastic melt is prevented or in any case reduced in this area on the flow channel wall.

It is also conceivable to design the area of the vertical, respectively radial edge of the distributor in such a manner that in order to reproduce the vertical, respectively radial edge, inserts are provided in the distributor, which consist of a material which has anti adhesive properties with regard to the plastic melt and additionally preferably has a positive impact on the sealing of the distributor. Adequate materials are more specifically thermosetting plastic, rubber, silicone rubber or polyurethane but also metals such as brass or copper.

Anti adhesive properties of the flow path-sided surface of the vertical or radial edge can support the previously mentioned measures for increasing the volume flow across the bar from a lower to an upper spiral, respectively from an upstream to a downstream spiral.

In any case, it is thus advantageous if the spiral distributor has a receptacle for an insert in the spiral distributor, preferably is immediately provided with the insert, the insert being preferably replaceable.

It has already been explained above that the spiral distributor can have a coating on the surface difference.

It is conceivable in an implementation of the invention to modify the horizontal edge or the edge running in the direction of the circumference in the manner described above, additionally or alternately to the vertical or radial edge. If this edge is equipped with a corresponding overflow facilitator, an adherence of plastic melt on this flow channel wall can be reduced and even prevented with an adequate design.

It must be explicitly mentioned that the preceding properties have been predominantly described only with respect to one spiral channel. As a rule, the achievable advantages will however be greater if corresponding properties are provided on several or even all spiral channels.

This applies more specifically if the spiral distributor consists of several geometrically identically running spiral channels.

The advantages described above for a spiral distributor also arise in an analog manner in a die head for a blown film line which is equipped with a spiral distributor described above.

The advantages also arise with a blown film line with an extruder, a die head as described above, a flattening unit and an extractor device, as well as preferably with a wrapping station.

The advantages finally extend to a method for manufacturing a blown film by using such a blown film line, as well as to a blown film which is produced with such a method.

BRIEF DESCRIPTION OF THE DRAWINGS

In the following, the invention is further described with the help of an exemplary embodiment with reference to the drawings. In the drawings.

DETAILED DESCRIPTION OF PREFERRED EMBODIMENTS

Figure 1:
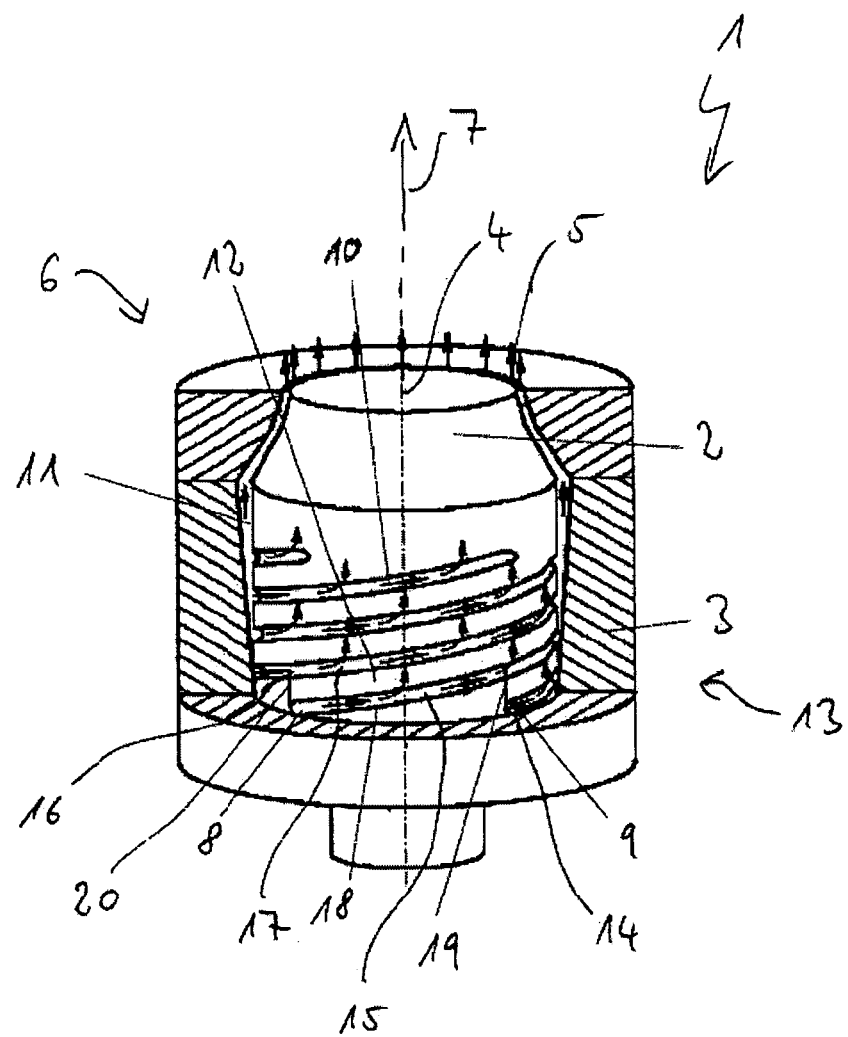
FIG. 1 shows a spatial, partially sectioned schematic view of a cylindrical axial spiral distributor according to the prior art.

The spiral distributor 1 in FIG. 1 is designed according to the prior art. It consists substantially of a central mandrel 2 which is surrounded by a mantle 3. In a pre-distributor (not shown), the melt stream supplied by an extruder (not shown) is initially divided into several individual streams, which flow into spiral-shaped channels. These are worked into the mandrel 1 and surround it in form of a multiple thread.

A central axis 4 is located coaxially to a ring-shaped outlet nozzle 5 at a downstream end 6 of the spiral distributor 1.

In a distributor flow direction 7, and thus in the extrusion direction, a channel depth of spiral channels 8, 9 (exemplarily labeled) decreases to zero at a channel end 10 (exemplarily labeled).

A gap 11 between the mandrel 1 and its opposite side formed by the mantle 3 increases continuously. This causes a melt stream flowing in a spiral to continuously divide into two parts: on the one hand a part which flows over a spillover bar 12 which is located between two spirals ; on the other hand a part which follows the course of the spiral channels 8, 9.

The melt leaves the extrusion tool as homogeneously as possible through the annular gap 5.

In a gusset area 13, the spiral channels 8, 9 run from beginnings 14 (exemplarily labeled), via beginning sections 15 (exemplarily labeled) to transition sections 16 (exemplarily labeled) and continuously onward in further sections 17 (exemplarily labeled).

There are several areas in the gusset area 13 where an adherence of melt can be feared because of horizontally running lower edges 18 and vertical edges 19, 20 (exemplarily labeled).

Figure 2:
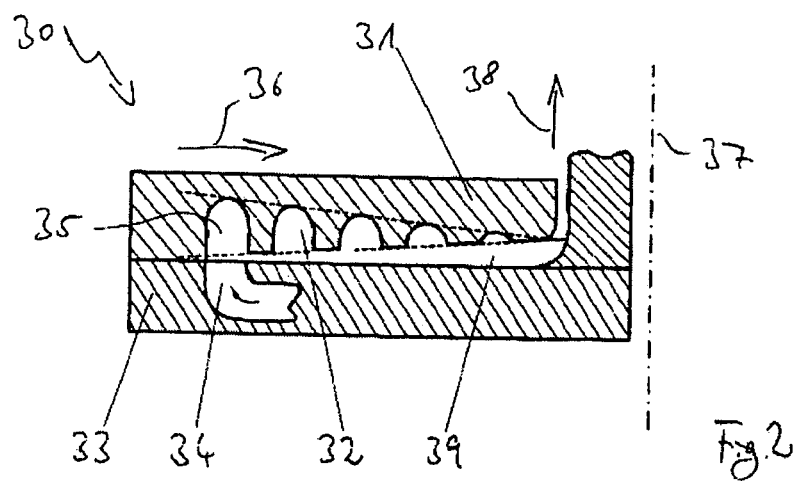
FIG. 2 shows a schematic radial section of one half of a radial spiral distributor, in which melt is fed to spiral channels radially outside, FIG. 3 a development of advantageous spiral channels.

The radial spiral distributor 30 in FIG. 2 which is also designed according to the prior art, consists substantially of a plate 31 in which spiral channels 32 (exemplarily labeled) are placed, and a counter plate 33 which also lies horizontally.

Regarding the risk of dead regions in the flow in the radial spiral distributor 30, the horizontal edges 18 and the vertical edges 19, 20 correspond to radial edges (not shown) which begin downstream of each spiral channel beginning (not shown) as well as edges (not shown) which follow the circumference of the distributor.

In the radial spiral distributor 30, the plastic melt is led during operation from pre-distributor channels 34 into beginnings 35 of the spiral channels 32. A channel depth of the spiral channels 32 decreases in the distributor flow direction 36, which is located radially toward a central axis 37, while the central axis 37 is located parallel to an extrusion direction 38, a gap 39 in the course of the distributor flow direction 36 increasing.

Figure 3:
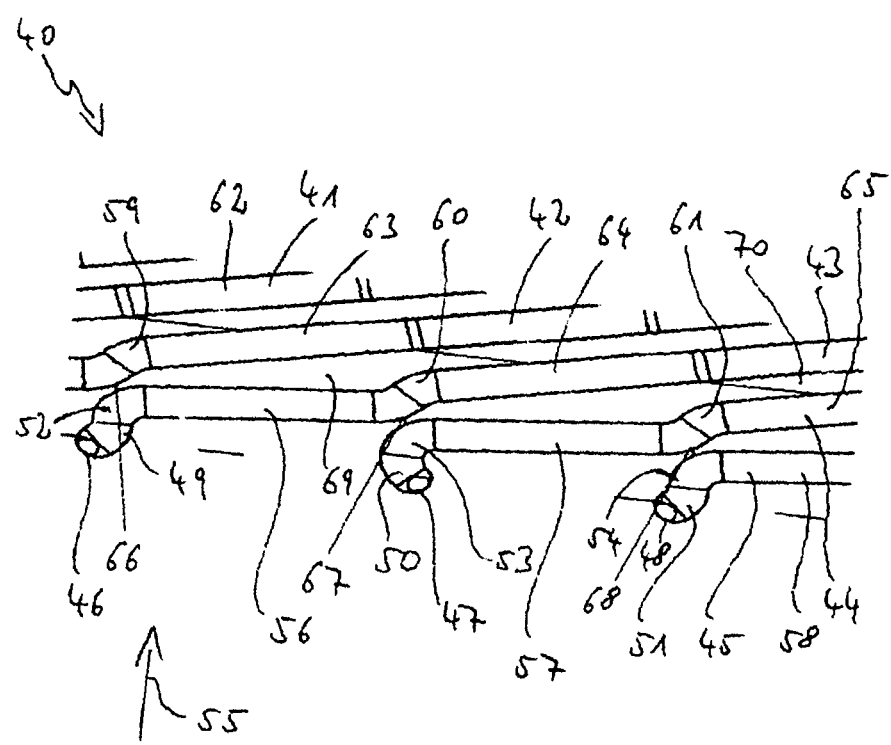

An intervention into the course geometry of the spiral channels 41, 42, 43, 44, 45 has occurred in a sectional development of the spiral distributor 40 in FIG. 3, which is an implementation of the invention:

Starting from the pre-distributor (not shown), the outlets 46, 47, 48 are located on the cylindrical axial spiral distributor 40. They flow into feed sections 49, 50, 51, respectively two feed sections 50, 51 being bent in pairs toward each other in order to allow pre-distributor channels disposed in the spiral distributor 40 to be led in a more compact manner.

The aperture sections 49, 50, 51 are very short and extend only until the spiral channels 41, 42, 43, 44, 45 have the same geometry. Respectively one first deviation, namely of just under 90°, is located there at beginnings 52, 53, 54. For instance, the angle can amount to approximately 85°.

At this angle relative to a distributor flow direction 55, the spiral channels 41, 42, 43, 44, 45 run initially straight along their beginning sections 56, 57, 58 until they are located downstream of the beginning sections 52, 53, 54 of directly adjacent spiral channels 42, 43, 44, 45, which means projectable further ahead onto the distributor flow direction 55. There, they have double deviations 59, 60, 61, which however do not result in a continuing parallel course of the spiral channels 41, 42, 43, 44, 45 but rather transition via a slight deviation into a greater rise in further sections 62, 63, 64, 65. The rise, that is the complementary angle relative to the distributor flow direction 55 up to 90°, in turn remains constant in the further sections 62, 63, 64, 65; thus, the spiral channels 41, 42, 43, 44, 45 run again straight in the further sections 62, 63, 64, 65.

Thus, immediately after passing over critical vertical edges 66, 67, 68, all the distributor channels 41, 42, 43, 44, 45 initially run with a short steep rise and subsequently have a greater constant rise relative to the beginning section 56, 57, 58.

A greater rise hereby also exists after the transition sections with the double deviations 59, 60, 61. This course of the rise affects the distribution of the melt in a favorable manner and additionally leads to a higher volume flow at the edges 66, 67, 68 and hence to a reduction of spiral strips.

As a consequence of the initially flat rise in the beginning sections 56, 57, 58, the vertical edges 66, 67, 68 are additionally distinctly shorter than in the prior art.

The comparatively rather short vertical edges 66, 67, 68 define the beginning of overflow bars 69 (exemplarily labeled). These are initially very short in the overflow direction, which lies parallel to the distributor flow direction 55. A great volume flow of the melt can occur here.

As a consequence of the subsequently increased rise of the spirals respectively located downstream, the overflow bar 69 is bigger at the next overlap with the next beginning spiral channel and has a constant width 70 (exemplarily labeled). This is advantageous for a good distribution of the melt.

In a preferred form of the invention, the spiral channel briefly rise with a steep rise only after the vertical edges 66, 67, 68 and then transitions into a constant greater rise relative to the beginning section. A slightly higher bar width hereby already exists directly after the vertical edges. This also favorably affects the distribution and additionally leads to a higher volume flow at the edges and thus to a further reduction of spiral strips.

It must be explicitly mentioned that the course and the cross-section geometries can be disposed not only in the mandrel or in the distributor plate but also in the counterpart disposed to that end.

Furthermore it must be explicitly mentioned that the invention can be used advantageously for one-layer die heads as well as for multi-layer die heads.

In other words, one aspect of the invention can be that at least one spiral channel has another rise in at least one flow path section than in the remaining flow path sections.

The rise of the spiral channel in a first area of the flow path, which extends from the beginning of the spiral channel to the beginning of the overlap with the next adjacent spiral channel in the direction of rotation of the spiral channel, can more specifically be smaller than in the flow path sections of the spiral channel following downstream.

After the first area, the rise of the spiral channel can be distinctly greater in a second area, which is limited to the beginning of the overlap with the next adjacent spiral channel in the direction of rotation of the spiral channel, and can subsequently run on in a third area of the spiral channel with a constant rise, which is bigger than in the first and smaller than in the second area.

It can be provided for instance that the rise in the first area is more than 0° but less than 20°, while adopting a maximum of far more than 30° in the second area and runs on in the third area with less than 30° but more than 10°.

With regard to the depth of the spiral channels it can be provided that the depth of at least one spiral channel in a first area, which extends from the beginning of the spiral channel to the beginning of the overlap with the next adjacent spiral channel in the direction of rotation of the spiral channel, is smaller than in the remaining areas and is either constant or decreases.

It can furthermore be provided that the depth of the spiral channel after the first area distinctly increases in a continuous manner in a second area, which is limited to the beginning of the overlap with the next adjacent spiral channel in the direction of rotation of the spiral channel, and subsequently decreases in a third area.

The invention claimed is:

1. A spiral distributor for a die head of a foil extrusion line with a central axis, which runs in the direction of the flow, and with a distributor flow direction which runs parallel to the central axis in the case of an axial spiral distributor, radially in the case of a radial spiral distributor and in the case of a conical spiral distributor so that it is projectable onto the axis, a gusset area having pre-distributor apertures all around it in beginnings of spiral channels, and the spiral channels running at an angle relative to the distributor flow direction, a first spiral channel starting at a beginning, passing a second directly adjacent spiral channel downstream at its beginning after an initial section and running on downstream of its initial section and of its further section in its further section as a continuous spiral channel, so that during operation of the die head melt issuing from the second spiral channel overflows an overflow bar in the distributor flow direction toward the first spiral channel lying downstream, wherein the spiral distributor has an overflow facilitator for the melt at the beginning, in the initial section and/or in an area where the initial section passes into the further section of a spiral channel, wherein a small-depth area of at least one spiral channel of the spiral channels comprises the beginning of the at least one spiral channel, comprises the initial section of the at least one spiral channel, ends at a beginning of the area where the initial section of the at least one spiral channel passes into the further section of the at least one spiral channel, and extends in a direction of rotation of the at least one spiral channel, wherein the depth of the small-depth area is smaller than each of the depths of remaining areas of the at least one spiral channel, and wherein the depth of the small-depth area is either constant or decreases.

2. The spiral distributor according to claim 1, wherein with regard to its course, a spiral channel has a bend, a curve or a deviation in its transition section.

3. The spiral distributor according to claim 1, wherein with respect to its course, a spiral channel has another rise height in its initial section than in its further section, more specifically a lesser rise height.

4. The spiral distributor according to claim 1, wherein the overflow bar has a widening along the initial section of the second spiral channel, so that during operation the bar width over which the melt is to flow in the distributor flow direction is small at the beginning of the initial section of the second spiral channel, from the initial section of the second spiral channel to the further section of the first spiral channel, and more specifically has a minimum downstream of its beginning.

5. The spiral distributor according to claim 1, wherein with respect to their course, the spiral channels have different beginnings at the pre-distributor apertures of the gusset area and subsequently run congruently in their initial and further sections.

6. The spiral distributor according to claim 1, wherein the spiral channels respectively have a straight course in their initial and further sections.

7. The spiral distributor according to claim 1, wherein a spiral channel cross-section has an extension and a reduction in the course of a spiral channel, more specifically a widening and a tapering with respect to a spiral channel width and/or a flattening with respect to a spiral channel depth.

8. The spiral distributor according to claim 1, wherein the spiral channel cross-section has lesser channel width and/or depth in the area where the initial section passes into the further section than in the further course of the further section of the spiral channel.

9. The spiral distributor according to claim 1, wherein in the further course after the area where the initial section passes into the further section, the spiral channel cross-section has at first a widening and/or deepening and subsequently a tapering and/or flattening.

10. The spiral distributor according to claim 1, wherein the spiral distributor has a local surface difference for an easier overflow.

11. The spiral distributor according to claim 1, wherein the spiral distributor has a receptacle for an insert in the spiral distributor on the surface difference.

12. The spiral distributor according to claim 1, wherein the spiral distributor has a coating on the surface difference.

13. A die head for a blown film line, with a spiral distributor according to claim 1.

14. A blown film line with an extruder, a die head according to claim 13, a flattening unit and an extractor device.

15. A method for manufacturing a blown film by using a blown film line according to claim 14.

* * * * *